United States Patent

[11] 3,622,673

[72] Inventor Jackson B. Hester, Jr.
Portage, Mich.
[21] Appl. No. 775,957
[22] Filed Nov. 14, 1968
Continuation-in-part of Ser. No. 663,244,
Aug. 25, 1967, continuation-in-part of Ser.
No. 548,880, May 10, 1966, abandoned.
[45] Patented Nov. 23, 1971
[73] Assignee The Upjohn Company
Kalamazoo, Mich.

[54] 4-(1,4,5,6-TETRAHYDROZEPINO 4,5-B INDOL-3(2H)-YL-BUTYROPHENON COMPOSITIONS AND PROCESS OF TREATMENT MENTAL OR EMOTIONAL DISORDERS
5 Claims, No Drawings

[52] U.S. Cl...................................................... 424/274,
260/326.5 B
[51] Int. Cl...................................................... A61k 27/00
[50] Field of Search........................................... 424/244,
274; 260/326.5 B

[56] References Cited
UNITED STATES PATENTS
3,419,569 12/1968 Renner.......................... 260/296

Primary Examiner—Stanley J. Friedman
Attorneys—Eugene O. Retter and Joseph K. Andonian ABSTRACT: Compounds of the formula

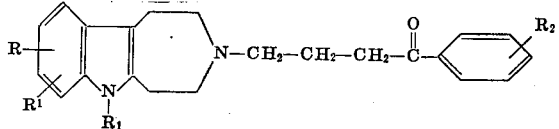

and the pharmacologically acceptable acid addition salts thereof wherein R and $R^1$ are hydrogen or methoxy; $R_1$ is hydrogen or methyl; and $R_2$ is fluorine prepared in unit dosage form for oral, rectal or parenteral administration having tranquilizing, antipsychotic, sedative, anticonvulsant, antiemetic and anorexigenic activity and a process for treating mental and emotional disorders by administering the foregoing compositions at a dosage of from 0.5 to 50 mg./kg./day.

4-(1,4,5,6-TETRAHYDROZEPINO 4,5-B INDOL-3(2H)-YL-BUTYROPHENON COMPOSITIONS AND PROCESS OF TREATMENT MENTAL OR EMOTIONAL DISORDERS

CROSS-REFERENCE TO RELATED APPLICATIONS

This application is a continuation-in-part of U.S. application Ser. No. 663,244, filed Aug. 25, 1967, now allowed, which in turn is related to U.S. application Ser. No. 548,880, filed May 10, 1966, now abandoned.

BRIEF SUMMARY OF THE INVENTION

This invention relates to pharmaceutical compositions prepared in unit dosage form comprising from about 10 to 500 of a compound of the formula

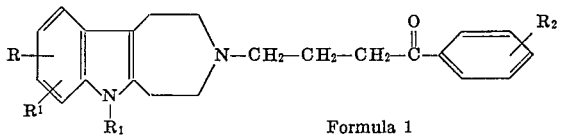

Formula 1 and the pharmacologically acceptable acid addition salts thereof wherein R and $R^1$ are hydrogen or methoxy; $R_1$ is hydrogen or methyl and $R_2$ is fluorine in association with a pharmaceutical carrier. Another aspect of the invention is a process for the treatment of birds and mammals for conditions arising out of mental or emotional disorders.

DETAILED DESCRIPTION

Compounds of the formula 1 and pharmacologically acceptable acid addition salts thereof can be prepared by methods disclosed in copending U.S. application Ser. No. 663,244, filed Aug. 25, 1967.

A compound of the formula 1 pharmacologically acceptable acid addition salts thereof are presented for oral administration in solid and liquid unit dosage forms, such as tablets, capsules, powders, granules, syrups, elixirs, and the like, containing suitable quantities of the compound.

Powders are quite simply prepared by comminuting a compound of the formula 1 or pharmacologically acceptable acid addition salts thereof to a suitably fine size and mixing with a similarly comminuted diluent. The diluent can be an edible carbohydrate material such as starch or lactose. Advantageously, a sweetening agent or sugar is present as well as a flavoring. Dry granulations for reconstitution with water are prepared utilizing water-soluble diluents. A powder mixture of finely divided compound of the formula 1 or pharmacologically acceptable acid addition salts thereof and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as a wetting agent and flavoring.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating by slugging, adding a lubricant and pressing into tablets. The powder mixture is prepared by mixing a compound of the formula 1 and pharmacologically acceptable acid addition salts thereof suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. An alternative granulating procedure is by slugging the powder mixture, i.e., run the powder mixture through a tablet machine and the resulting large tablets broken into pieces (slugs). The slugs can be lubricated to prevent sticking to the tablet-forming dies by means of the addition of stearic acid, a stearate salt, talc, or mineral oil. The lubricated mixture is then compressed into tablets of the required weight.

Advantageously, the tablet can be provided with a protective coating consisting of a sealing coat of shellac, a coating of sugar and methylcellulose and a polish coating of carnauba wax.

Oral fluids are prepared in unit dosage forms such as syrups and elixirs wherein each teaspoonful of composition contains a predetermined amount of a compound of the formula 1 and pharmacologically acceptable acid addition salts thereof for administration.

A syrup is prepared using a water-soluble salt of a compound of the formula 1 in a suitably flavored aqueous sucrose solution. Similarly an elixir is prepared utilizing a hydroalcoholic vehicle. Elixirs are advantageous vehicles for use when another therapeutic agent which is not sufficiently water soluble is to be included in the composition.

For parenteral administration aqueous fluid unit dosage forms can be prepared. In preparing the parenteral form, a measured amount of a water-soluble salt of a compound of the formula 1 and a pharmacologically acceptable acid is placed in a vial, the vial and its contents sterilized and sealed. An accompanying vial of sterile water is provided as a vehicle to form a solution prior to administration. Advantageously, the sterile water can have dissolved therein a local anesthetic and buffering agents.

Alternatively, a parenteral suspension can be prepared by suspending an insoluble form of a compound of the formula 1 in a sterile aqueous vehicle or in a parenterally acceptable vegetable oil with or without additional adjuvants.

In addition to oral and parenteral administration, the rectal route can be utilized. A compound of the formula 1 and pharmacologically acceptable acid addition salts thereof can be administered by means of a suppository. A vehicle which has a melting point at about body temperature or one that is readily soluble can be utilized. For example, cocoa butter and various solid polyethylene glycols can serve as the vehicle.

For the treatment of domestic birds and animals by oral administration, a compound of the formula 1 and pharmacologically acceptable acid addition salts thereof is conveniently prepared in the form of a food premix. The food premix can comprise the active material in admixture with an edible diluent such as starch, oatmeal, flour, calcium carbonate, talc, dried fish meal and the like nontoxic, orally acceptable edible diluents. The prepared premix is then conveniently added to the regular feed, thereby providing medication to the animal or bird in the course of feeding.

The compositions of the present invention have tranquilizing, antipsychotic, sedative, anticonvulsant, antiemetic, and anorexigenic activity. The compositions are useful in the treatment of mental and emotional disorders; as adjuncts to surgical and obstetrical sedation to allay apprehension and reduce the requirement for narcotics, analgesics and sedatives; in the treatment of aggressive behavior, states of anxiety, schizophrenia, obesity, tension, agitation, apprehension, agitated depression and sleep disturbances accompanied by anxiety; in the management of nausea and vomiting of either CNS or gastric reflex action; in the management of alcohol induced syndromes such as delirium tremens, acute hallucinosis, acute tremulousness and inebriation; and in the management of withdrawal symptoms of drug addition.

The amount of a compound of the formula 1 and pharmacologically acceptable acid addition salts thereof to be administered varies with the weight, age, condition, route of administration and species of animal. In general a dose of from about 0.5 to about 50 mg./kg./day and preferably from about 1 to about 20 mg./kg./day is administered. The human daily dose can be from about 5 to about 2,500 mg. in single or divided doses and preferably 10 to 500 mg. twice to four times daily.

Conveniently the compositions are prepared in dosage unit form of from about 10 to about 500 mg. per dosage unit.

In addition to the administration of a compound of the formula 1 and pharmacologically acceptable acid addition salts thereof as the principal active ingredient of compositions described herein, the said compound can be included with other types of active compounds to obtain advantageous combinations of properties.

Such combinations, include, in approximately the indicated amounts: other antipsychotic and antianxiety agents such as chlorpromazine (5–50 mg.), thioridazine (5–100 mg.), haloperidol (0.5–5 mg.), meprobamate (100–400 mg.), ectylurea (100–300 mg.), chlordiazepoxide (5–50 mg.), and diazepam (2–15 mg.); antidepressants such as amitriptyline HCl 10–50 mg.), methylphenidate HCl(5–20 mg.), d-amphetamine SO$_4$ (2–15 mg.) and methamphetamine HCl (2–15 mg.); antihypertensive and diuretic agents such as hydrochlorothiazide (1514 50 mg.), hydralazine (10–100 mg.), methyldopa (100–250 mg.), quanethidine (10–50 mg.), ethoxzolamide (50–150 mg.) and reserpine (0.25–1 mg.); barbiturates such as phenobarbital (8–60 mg.), butabarbital (8–60 mg.) and amobarbital (16–120 mg.); analgesics such as aspirin (150–600 mg.) and acetaminophen (150–600 mg.).

The following examples illustrate the best mode contemplated by the inventor for carrying out the invention but are not to be construed as limiting the scope thereof.

EXAMPLE 1

One thousand tablets for oral use, each containing 100 mg. of 4'-fluoro-4-(1,4,5,6-tetrahydroazepino[4,5-b]indol-3(2H)yl)butyrophenone are prepared from the following ingredients:

| | |
|---|---|
| 4'-Fluoro-4-(1,4,5,6-tetrahydroazepino-[4,5-b]indol-3(2H)yl)butyrophenone | 100 gm. |
| Dicalcium phosphate | 200 gm. |
| Methylcellulose, U.S.P. (15 cps.) | 6.5 gm. |
| Talc | 30 gm. |
| Calcium stearate | 3.5 gm. |

The 4'-fluoro-4-(1,4,5,6-tetrahydroazepino[4,5-b]indol-3-(2H)-yl)butyrophenone and dicalcium phosphate are mixed well, granulated with 7.5 percent w./v. aqueous solution of methylcellulose, passed through No. 8 screen and dried carefully. The dried granules are passed through a No. 12 screen, mixed with the talc and stearate and compressed into tablets.

The foregoing tablets are useful in the treatment of anxiety and tension in adult humans at a dosage of 1 tablet per day.

EXAMPLE 2

One thousand two-piece hard gelatin capsules for oral use, each capsule containing 10 mg. of 4'-fluoro-4-(1,4,5,6-tetrahydroazepino[4,5e-b]indol-3(2H)yl)butyrophenone and 15 mg. of phenobarbital, are prepared from the following ingredients:

| | |
|---|---|
| 4'-Fluoro-4-(1,4,5,6-tetrahydroazepino-[4,5-b]indol-3(2H)yl)butyrophenone | 10 gm. |
| Phenobarbital | 15 gm. |
| Corn starch | 120 gm. |
| Talc | 60 gm. |
| Magnesium stearate | 25 gm. |

The finely powdered materials are mixed thoroughly, then filled into hard gelatin capsules of appropriate size.

The foregoing capsules are useful in treatment of children for major motor seizures due to epilepsy, at a dosage of 1 capsule twice a day.

EXAMPLE 3

An aqueous oral preparation containing in each 5 ml. 50 mg. of 4'-fluoro-4-(1,4,5,6-tetrahydroazepino[4,5-b]indol-3(2H)yl)butyrophenone hydrochloride, is prepared from the following ingredients:

| | |
|---|---|
| 4'-Fluoro-4-(1,4,5,6-tetrahydroazepino-[4,5-b]indol-3(2H)yl)butyrophenone HCl | 100 gm. |
| Methylparaben | 7.5 gm. |
| Propylparaben | 2.5 gm. |
| Saccharin sodium | 12.5 gm. |
| Cyclamate sodium | 2.5 gm. |
| Glycerin | 3,000 ml. |
| Tragacanth powder | 100 gm. |
| Orange oil flavor | 10 gm. |
| F. D. and C. Orange dye | 7.5 gm. |
| Deionized water q.s. | 10,000 ml. |

The foregoing composition is useful in the control of hyperactive behavior problems in children at a dosage of 1 teaspoonful every 6 hours.

EXAMPLE 4

A sterile aqueous suspension for intramuscular injection, containing in each ml. 100 mg. of 4'-fluoro-4-(1,4,5,6-tetrahydroazepino[4,5e-b]indol-3(2H)yl)butyrophenone, is prepared from the following ingredients:

| | |
|---|---|
| 4'Fluoro-4-(1,4,5,6-tetrahydroazepino-[4,5-b]indol-3(2H)-yl)butyrophenone | 100 gm. |
| Sodium carboxymethylcellulose, low viscosity | 10 gm. |
| Polysorbate 80, U.S.P. | 4 gm. |
| Propylparaben, U.S.P. | 0.4 gm. |
| Water for injection q.s. | 1,000 ml. |

The foregoing parenteral suspension is useful in the treatment of acute agitation in a senile adult at a dosage of 1 ml. twice a day.

EXAMPLE 5

One thousand tablets are prepared from the following types and amounts of ingredients:

| | |
|---|---|
| 4'-Fluoro-4-(1,4,5,6-tetrahydroazepino-[4,5-b]indol-3(2H)yl)butyrophenone | 500 gm. |
| Citric acid, powder | 50 gm. |
| Talc | 50 gm. |
| Magnesium stearate | 2.5 gm. |

The ingredients are mixed together and slugged. The slugs are screened and pressed into tablets. The foregoing tablets are useful in the treatment of withdrawal symptoms due to drug addition at a dose of 1 tablet every 6 hours.

EXAMPLE 6

One thousand hard gelatin capsules are prepared from the following types and amounts of ingredients:

| | |
|---|---|
| 4'-Fluoro-4-(1,4,5,6-tetrahydroazepino-[4,5-b]indol-3(2H)yl)butyrophenone | 250 gm. |
| Ascorbic acid | 15 gm. |
| Starch | 25 gm. |
| Terra alba | 75 gm. |
| Magnesium stearate | 3.5 gm. |

The ingredients are powdered and mixed together until uniformly dispersed and filled into hard gelatin capsules.

The capsules are useful in the treatment of delirium tremens due to alcoholism at a dose of 1 capsule every 6 hours.

EXAMPLE 7

One thousand tablets for oral administration, each containing 25 mg. of 4'-fluoro-4-(1,4,5,6-tetrahydroazepino[4,5-b]indol-3(2H)yl)butyrophenone and 16.2 mg. of phenobarbital are prepared from the following types and amounts of ingredients:

| | |
|---|---|
| 4'-Fluoro-4-(1,4,5,6-tetrahydroazepino-[4,5-b]indol-3(2H)yl)butyrophenone | 25 gm. |
| Phenobarbital | 16.2 gm. |
| Lactose | 175 gm. |
| Starch | 15 gm. |
| Magnesium stearate | 1.5 gm. |

The ingredients are thoroughly mixed and slugged. The slugs are broken down by forcing through a screen and the resulting granules are then compressed into tablets.

The preceding tablets are useful for the prevention of convulsive seizures in dogs at a dose of 1 tablet twice a day.

EXAMPLE 8

One thousand ml. of a syrup is prepared from the following types and amounts of ingredients:

| | |
|---|---|
| 4'-Fluoro-4-(1,4,5,6-tetrahydroazepino-[4,5-b]indol-3(2H)yl)butyrophenone hydrochloride | 50 gm. |
| Cocoa syrup U.S.P., q.s. | 1,000 ml. |

The 4'-fluoro-4-(1,4,5,6-tetrahydroazepino[4,5-b]indol-3-(2H)yl)butyrophenone hydrochloride is stirred with cocoa syrup until dissolved.

The syrup is useful in the treatment of adult schizophrenia at a dose of 1 teaspoonful four times a day.

EXAMPLE 9

One thousand ml. of an elixir, containing 100 mg. of 4'-fluoro-4-(1,4,5,6-tetrahydroazepino[4,5-b]indol-3(2H)-yl)butyrophenone hydrochloride and 8.1 mg. of phenobarbital in each 5 ml., is prepared from the following types and amounts of ingredients:

| | |
|---|---|
| 4'-Fluoro-4-(1,4,5,6-tetrahydroazepino-[4,5-b]indol-3(2H)yl)butyrophenone hydrochloride | 20 gm. |
| Phenobarbital | 1.62 gm. |
| Citric acid | 0.1 gm. |
| F.D.C. Red No. 1 | 0.04 gm. |
| Saccharin | 0.1 gm. |
| Sucrose | 200 gm. |
| Oil of spearmint | 0.1 gm. |
| Oil of wintergreen | 0.1 gm. |
| Polysorbate 80 U.S.P. | 1 gm. |
| Ethanol 95% | 200 ml. |
| Glycerin | 150 ml. |
| Water q.s. | 1000 ml. |

The sugar is dissolved in 450 ml. of water and the citric acid, color and the 4'-fluoro-4-(1,4,5,6-tetrahydroazepino[4,5-b]indol-3(2H)yl)butyrophenone hydrochloride added thereto. The phenobarbital and saccharin are added to the mixture of alcohol and glycerin and stirred until dissolved. The flavors are mixed with the polysorbate 80 and added to the alcohol-glycerin solution followed by the addition of the sugar solution and sufficient water to make 1,000 ml.

The syrup is useful in the treatment of schizophrenic children at a dose of 1 teaspoonful three times a day.

EXAMPLE 10

A sterile aqueous solution for parenteral administration, containing 50 mg. of 4'-fluoro-4-(1,4,5,6-tetrahydroazepino-[4,5-b]indol-3(2H)yl)butyrophenone hydrochloride in each ml., is prepared from the following types and amounts of ingredients:

| | |
|---|---|
| 4'-Fluoro-4-(1,4,5,6-tetrahydroazepino-[4,5b]indol-3(2H)yl)butyrophenone hydrochloride | 50 gm. |
| Chlorobutanol, anhydrous | 5 gm. |
| Water for injection q.s. | 1,000 ml. |

The 4'-fluoro-4-(1,4,5,6-tetrahydroazepino[4,5-b]indol-3(2H)yl)butyrophenone hydrochloride and chlorobutanol are dissolved in the water for injection and the solution sterilized by filtration. The sterile solution if filled into 2 ml. sterile vials and sealed.

The composition is useful in the treatment of anxiety prior to surgery at a dose of 1 ml.

EXAMPLE 11

One thousand capsules for oral administration are prepared from the following ingredients:

| | |
|---|---|
| 4'-Fluoro-4-(1,4,5,6-tetrahydroazepino[4,5-b]indol-3(2H)yl)butyrophenone micropulverized | 100 gm. |
| Lactose, hydrous | 132.5 gm. |
| Magnesium stearate powder | 2.5 gm. |

The powders are mixed thoroughly and filled into No. 3 hard gelatin capsules.

The capsules are useful in the treatment of schizophrenic adults at a dose of one capsule four times a day.

EXAMPLE 12

One thousand capsules for oral administration are prepared from the following ingredients:

| | |
|---|---|
| 4'-Fluoro-4-(1,4,5,6-tetrahydroazepino-[4,5-b]indol-3(2H)yl)butyrophenone micropulverized | 50 gm. |
| Lactose, hydrous | 207.5 gm. |
| Magnesium stearate powder | 2.5 gm. |

The powders are mixed thoroughly and filled into No. 3 hard gelatin capsules.

The capsules are useful in the treatment of schizophrenic children at a dose of one capsule three times a day.

EXAMPLE 13

One thousand suppositories, each weighing 2.5 gm. and containing 250 mg. of 4'-fluoro-4-(1,4,5,6-tetrahydroazepino-[4,5-b]indol-3(2H)yl)butyrophenone are prepared from the following types and amounts of ingredients:

| | |
|---|---|
| 4'-fluoro-4-(1,4,5,6-tetrahydroazepino[4,5-b]indol-3(2H)yl)butyrophenone | 250 gm. |
| Propylene glycol | 165 gm. |
| Polyethylene glycol 4000 q.s. | 2,500 gm. |

The 4'-fluoro-4-(1,4,5,6-tetrahydroazepino[4,5-b]indol-3(2H)yl)butyrophenone is added to the propylene glycol and the mixture milled until uniformly dispersed. The PEG 4000 is melted and the propylene glycol dispersion added. The suspension is poured into molds and allowed to cool and solidify.

The foregoing suppositories are useful in the treatment of postsurgical anxiety and pain at a dose of of 1 suppository rectally twice a day.

EXAMPLE 14

Following the procedure of the preceding examples 1 to 13, inclusive, dosage forms are similarly prepared by substituting an equivalent amount of 4'-fluoro-4-(1,4,5,6-tetrahydro-10-methoxyazepino[4,5-b]indol-3(2H)yl)butyrophenone 4'-fluoro-4-(1,4,5,6-tetrahydro-10-methoxy-6-methylazepino[4,5-b]-indol-3(2H)yl)butyrophenone 4'fluro-4-(1,4,5,6-tetrahydro-9-methoxyazepino[4,5-b]indol-3 (2H)yl)butyrophenone 4'-fluoro-4-(1,4,5,6-tetrahydro-8-methoxyazepino[4,5-b]indol-3(2H)yl)butyrophenone 4'fluoro-4-(1,4,5,6-tetrahydro-6-methylazepino-[4,5-b]indol-3(2H)yl)butyrophenone and 4'fluoro-4-(1,4,5,6-tetrahydro-9- methylazepino[4,5-b]indol-3(2H)yl)butyrophenone respectively for the 4'-fluoro-4-(1,4,5,6-tetrahydroazepino-[4,5-b]indol-3(2H)yl)butyrophenone of the examples.

I claim:

1. A pharmaceutical composition for treating mental or emotional disorders comprising, in dosage unit form, from about 10 to about 500 mg. of a compound of the formula:

where R and R$^1$ are hydrogen or methoxy, R$_1$ is hydrogen or methyl, and R$_2$ is fluorine, or a pharmacologically acceptable acid addition salt thereof in association with a pharmaceutical carrier.

2. A composition of claim 1 wherein the compound is 4'-fluoro-4-(1,4,5,6-tetrahydroazepino[4,5-b]indol-3(2H)yl)butyrophenone.

3. A process for treating mental or emotional disorders comprising administering to a mentally or emotionally disordered subject a compound of the formula:

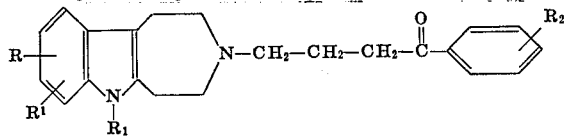

wherein R and R¹ are hydrogen or methoxy, $R_1$ is hydrogen or methyl, and $R_2$ is fluorine, or a pharmacologically acceptable acid addition salt thereof in association with a pharmaceutical carrier.

4. The process of claim 3 wherein the amount of compound administered is from about 5 to about 2,500 mg.

5. The process of claim 3 wherein the amount of compound administered is from about 0.5 to about 50 mg. per kg. of the subjects body weight per day.